T. TATTERSHALL.
ATTACHMENT FOR LATHES.
APPLICATION FILED FEB. 4, 1910.
998,656.
Patented July 25, 1911.
2 SHEETS—SHEET 1.
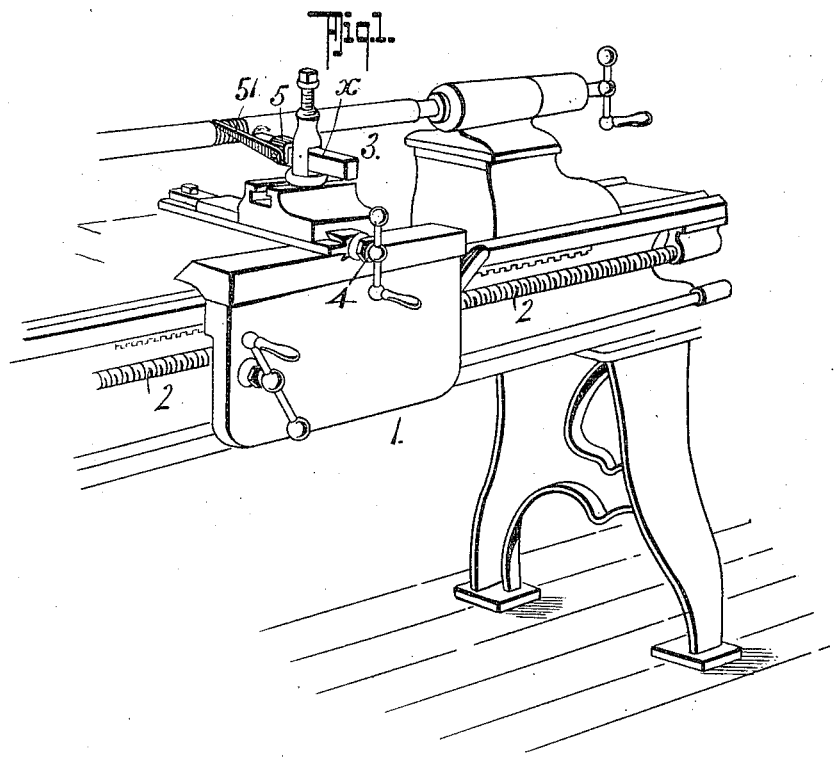
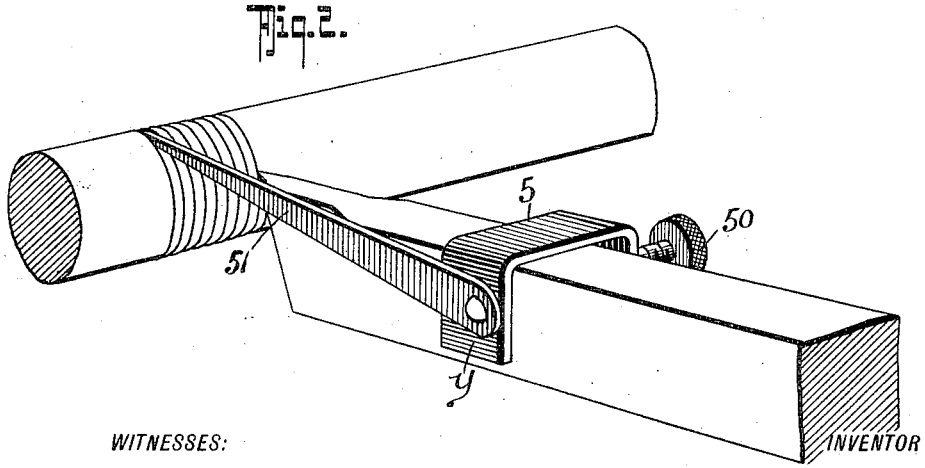
WITNESSES:
Charles H. Wagner.
Hayward Woodard
INVENTOR
Thomas Tattershall
BY
Fred G. Dieterich
ATTORNEYS

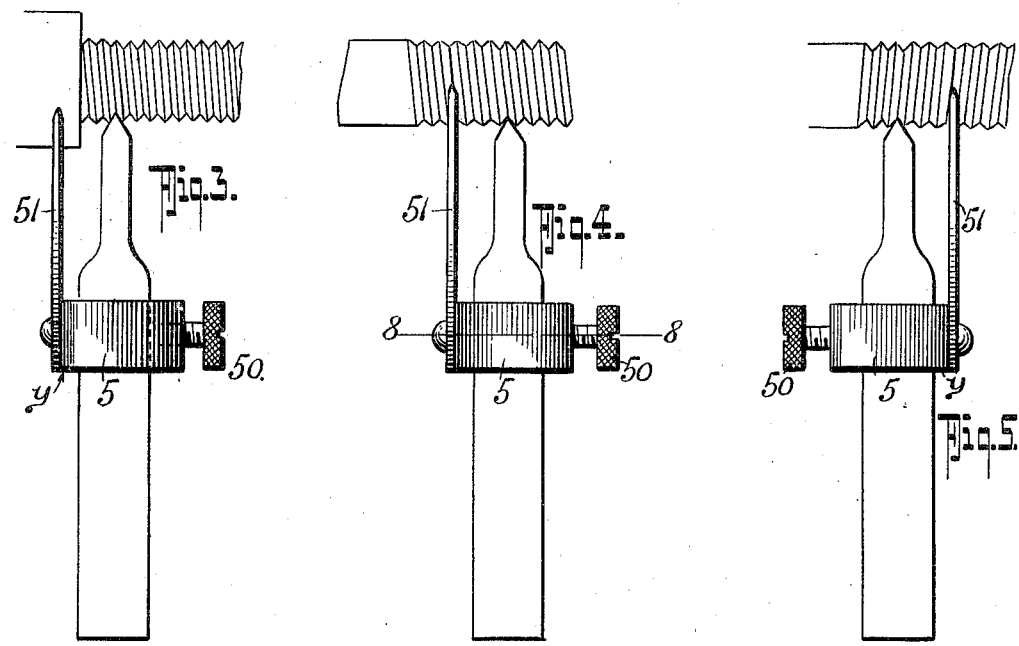
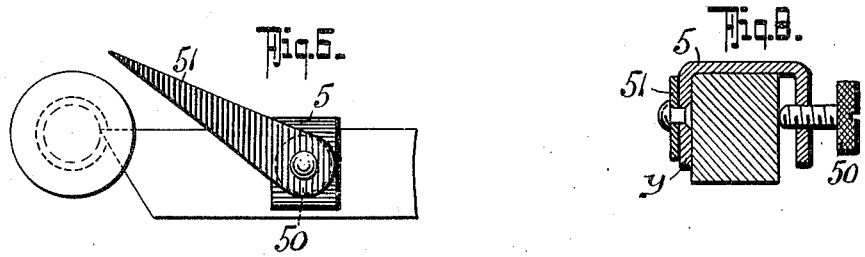
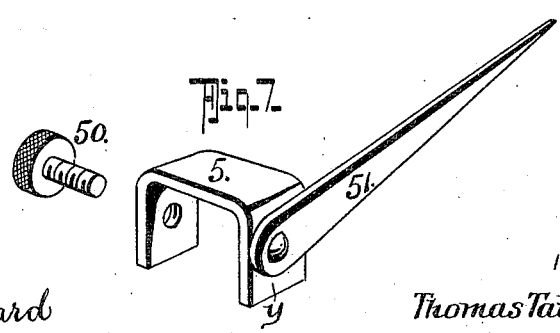

UNITED STATES PATENT OFFICE.

THOMAS TATTERSHALL, OF NEWPORT, KENTUCKY.

ATTACHMENT FOR LATHES.

998,656.  Specification of Letters Patent.  Patented July 25, 1911.

Application filed February 4, 1910. Serial No. 542,107.

*To all whom it may concern:*

Be it known that I, THOMAS TATTERSHALL, residing at Newport, in the county of Campbell and State of Kentucky, have invented a new and Improved Attachment for Lathes, of which the following is a specification.

This invention is in the nature of an improved tool, especially designed for being used in connection with chasing threads, and on that type of screw cutting lathes where there is no indicator.

In the art of chasing threads, especially with lathes having no indicator devices for facilitating the adjustments of the screw cutter head, it is usual for the machinist to stop the lathe and run the carriage or head back a number of inches to catch the same thread. This method of adjusting the carriage is wasteful in the loss of time required for picking up the desired thread and the danger of mutilating or improperly chasing or cutting the threads.

My invention has for its object to provide a very simple and inexpensive device adapted to be attached to the ordinary types of chasing tools or cutter heads, and which can be almost instantly adjusted or set to the cut taken, and it comprehends, generally, a clamp having means for detachably joining to the chasing tool of a screw cutting lathe and a pointer pivotally joined with the clamp and arranged to be projected onto the threaded portion of the rod being threaded, the said parts, the clamp and pointer being correlatively so arranged that they can be easily adjusted on a chasing tool for use when chasing either right or left hand threads.

My invention also embodies a device of the character stated that includes a pointer capable of being instantly set for the first cut and also for being thrown up out of the way, when chasing against a shoulder.

In its subordinate features, my invention consists in certain details of construction and peculiar combination of parts, all of which will be hereinafter fully described, specifically pointed out in the appended claims and illustrated in the accompanying drawing, in which:—

Figure 1, is a perspective view of so much of a screw cutting lathe as is necessary to show the application of my attachment or tool, the same being shown as adjusted to engage the first cut. Fig. 2, is a perspective view of my invention. Fig. 3, is a top plan view, the parts being positioned for chasing against a shoulder. Fig. 4, is a top plan view of the tool, the same being adjusted for chasing a right hand thread. Fig. 5, shows the tool set for chasing a left hand thread. Fig. 6, shows the position of the pointer when chasing against a shoulder. Fig. 7, is a perspective view of the several parts constituting my invention. Fig. 8, is a cross section on the line 8—8 on Fig. 4.

In the drawing, 1 designates a part of the lathe bed, 2 the main or lead screw with which the half nut coöperates in the usual manner, 3 is the cutter head or carriage and 4 the feed screw therefor, the said parts being of any well-known construction and need not be further described in detail.

My invention comprises the device or tool shown in detail in Fig. 5 and it consists of a head or clamp portion 5 cast or otherwise formed of metal U-shaped to readily be slipped onto chasing tool $x$ of the cutter head or carriage with which it travels, and to which it is clamped by the set screw 50.

51 designates a pointer, of a flexible material, so it can be bent to any position desired, and it is pivotally mounted on the part $y$ of the clamp 5 to swing in the vertical plane that it may be thrown up out of the way when chasing against a shoulder, see Fig. 2.

By forming the clamp head and joining the pointer thereto as shown, the tool can be readily reversed when changing from right to left hand thread chasing.

Assume that it is desired to cut a thread on the end of a rod or bolt. The stock is placed in the lathe chuck in the usual manner, and the thread cutting tool is secured in the tool carriage. The gearing of the lathe having been adjusted into gear and the lathe started, the operator then feeds the cutting tool to the work a sufficient distance so that when the cutting tool comes into contact with the work the initial cut for the thread desired will be made on the rod. Having made the initial cut on the rod, the operator stops the lathe, throws the half nut out to disconnect the feed of the tool carriage. He next moves the tool carriage to a position in which the thread cutting tool may be brought into engagement with the threaded body. Clamping the tool carriage in this position to hold it steady he next applies my attachment, as indicated in Fig. 4 of the drawings. When my attachment has been secured to the cutting tool (the lathe and the cutting tool feed being stationary at that time) the pointer 51 is moved until it centers on the thread. Should the pointer when moved adjacent to the thread not center it is bent to one side or the other until it does center. This adjustment of the attachment having been accomplished, the operator next withdraws the cutting tool from the work by reversing its feed and then moves the tool carriage back to its initial position. Having moved the tool carriage back to its initial position, he throws it into connection with the tool feed screw so that it will automatically feed to cut the thread. In throwing it into connection with such screw should the pointer not center on the thread the tool carriage is again disconnected from the feed screw of the lathe and moved to one side or the other a distance sufficient to bring the pointer 51 into alinement with the center of the thread. At this time the cutting tool will be at one side of the thread being cut. The cutting tool is then advanced to make the second cut on the thread, after which the lathe is started and when the tool again comes into engagement with the rod to cut the thread it will be in proper alinement with the cut formerly taken. My invention is essentially a guide for use in cutting threads more particularly on the end of a rod or the like, and it is designed to enable the cutting tool to be advanced to effect the second or succeeding cuts before the cutting tool comes into engagement with the piece on which the thread is being cut. In other words, assume that the thread is being cut on the end of a rod the end of which is at the right of Fig. 4. The initial cut has been taken, the cutting tool is in the center of the cut and the pointer 51 has been adjusted to come into the center of the cut. The lathe is now in motion. The operator now turns the feeding device 4 to bring the cutting tool $x$ away from the thread. He next moves the cutting tool from left to right in Fig. 4, until the pointer 51 is in engagement with the first portion of the thread at the end of the rod. At this time the cutting tool will be beyond the end of the rod. The operator then turns the feeding mechanism 4 of the lathe carriage to advance the cutting tool a sufficient distance to make the second cut on the thread, that is, to increase its depth from the first cut. After which, the lathe is started up, the half nut thrown into gear to cause the cutting tool to be fed toward the work, it being understood that before starting the lathe the pointer 51 is moved up to clear the thread, as shown in Fig. 6, of the drawings. Now as the tool carriage is fed by the lathe screw 2 toward the work to make the second cut, the cutting tool will come into engagement with the work in exactly the right position to follow in the original cut made and increase its depth.

Without the use of my invention, it frequently occurs that in advancing the cutting tool to make the second and succeeding cuts when the tool carriage is again thrown in, the tool does not always follow the cut originally taken, with the result that the thread is not properly cut. This is particularly the case when the work has been removed from the chuck and replaced. With my attachment, the time of operation of cutting a thread is materially shortened.

As before stated, my attachment is a guide to assist in effecting the proper adjustment of the thread cutting tool in making cuts succeeding the first one, so that the thread cutting tool will always enter the cut first made after it has been advanced to effect the deeper cut.

Having thus described my invention, what I claim is:

1. An attachment for screw cutting lathes, comprising a head member adapted to be clamped on the chasing tool of the cutter head or carriage to travel therewith, and a pointer adapted to project from the said tool to engage the cut made.

2. An attachment for lathes, comprising a head member adapted to be clamped on the chasing tool to travel therewith and a pointer pivotally connected to the head to swing into the cut and movable away from the said cut.

3. An attachment for lathes, comprising a head member having means for clamping it in reverse positions on the chasing tool of a cutter carriage and a pointer projected laterally from the said head.

4. An attachment for lathes, comprising a head member having means for clamping it in reverse position on the chasing tool, and a pointer pivotally connected to the said head.

5. An attachment for lathes, consisting of a head member having a clamping screw for attaching it to the chasing tool of a cutter carriage of the lathe, and a flexible pointer projected from the head member and pivotally connected thereto.

6. A tool for the purpose described, consisting of a U-shaped head member having a set screw in one of its parallel ends, and a flexible pointer pivotally joined to the other parallel arm to extend outwardly therefrom.

THOMAS TATTERSHALL.

Witnesses:
BLAINE McLAUGHLIN,
ALMA M. KOHLER.